(12) United States Patent
Yoshioka et al.

(10) Patent No.: US 12,557,072 B2
(45) Date of Patent: Feb. 17, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 360 days.

(21) Appl. No.: 17/641,326

(22) PCT Filed: Sep. 12, 2019

(86) PCT No.: PCT/JP2019/035987
§ 371 (c)(1),
(2) Date: Mar. 8, 2022

(87) PCT Pub. No.: WO2021/048991
PCT Pub. Date: Mar. 18, 2021

(65) Prior Publication Data
US 2022/0338172 A1   Oct. 20, 2022

(51) Int. Cl.
*H04W 72/02* (2009.01)
*H04L 1/1812* (2023.01)
*H04L 5/00* (2006.01)
*H04W 72/0446* (2023.01)
*H04W 72/20* (2023.01)
*H04W 92/18* (2009.01)

(52) U.S. Cl.
CPC ........... *H04W 72/02* (2013.01); *H04L 1/1812* (2013.01); *H04L 5/0053* (2013.01); *H04W 72/0446* (2013.01); *H04W 72/20* (2023.01); *H04W 92/18* (2013.01)

(58) Field of Classification Search
CPC . H04W 72/02; H04W 72/0446; H04W 72/20; H04W 92/18; H04W 72/0406; H04W 72/40; H04L 1/1812; H04L 5/0053; H04L 1/1854; H04L 1/1825; H04L 2001/0097
See application file for complete search history.

(56) References Cited

U.S. PATENT DOCUMENTS

2008/0320356 A1    12/2008   Tokita
2019/0306923 A1*   10/2019   Xiong ................... H04L 27/261
(Continued)

FOREIGN PATENT DOCUMENTS

JP    2009-004890 A    1/2009

OTHER PUBLICATIONS

Fujitsu, Discussion on mode 1 resource allocation for NR V2X, 3GPP TSG RAN WG1 #98, Prague, CZ, Aug. 26-30, 2019, R1-1908219 (Year: 2019).*

(Continued)

*Primary Examiner* — Ji-Hae Yea
(74) *Attorney, Agent, or Firm* — Osha Bergman Watanabe & Burton LLP

(57) ABSTRACT

A terminal includes a transmitting unit that transmits, on a sidelink resource, at least one of a transport block or control information; and a control unit that selects a specific operation related to feedback, to a base station, of Hybrid Automatic Repeat Request-Acknowledgement (HARQ-ACK) for the sidelink resource, in response to detecting that feedback for the at least one of the transport block or the control information is not performed.

4 Claims, 6 Drawing Sheets

(56) References Cited

U.S. PATENT DOCUMENTS

| | | | | |
|---|---|---|---|---|
| 2020/0323023 | A1* | 10/2020 | Miao | H04W 76/14 |
| 2022/0007403 | A1* | 1/2022 | Li | H04W 72/20 |
| 2022/0045800 | A1* | 2/2022 | Chen | H04L 1/1867 |

OTHER PUBLICATIONS

3GPP R1-1901482, Final Report of 3GPP TSG RAN WG1 #95 v1.0.0, Spokane, USA, Nov. 12-16, 2018 (Year: 2018).*
Fujitsu ("Discussion on mode 1 resource allocation for NR V2X", 3GPP TSG RAN WG1 #98, R1-1908219, Aug. 26-30, 2019) (Year: 2019).*
Samsung; "Considerations on Sidelink HARQ Procedure"; 3GPP TSG RAN WG1 #96, R1-1902278; Athens, Greece; Feb. 25-Mar. 1, 2019 (11 pages).
Ericsson; "Feature lead summary#1 on Resource allocation for NR sidelink Mode 1"; 3GPP TSG-RAN WG1 Meeting #98, R1-1909487; Prague, CZ; Aug. 26-30, 2019 (33 pages).
Extended European Search Report issued in European Application No. 19945167.5, dated Mar. 24, 2023 (11 pages).
Office Action issued in Chinese Application No. 201980099933.1, dated Jun. 7, 2023 (15 pages).
International Search Report issued in PCT/JP2019/035987 on Apr. 14, 2020 (4 pages).
Written Opinion of the International Searching Authority issued in PCT/JP2019/035987 on Apr. 14, 2020 (3 pages).
Fujitsu; "Discussion on mode 1 resource allocation for NR V2X"; 3GPP TSG RAN WG1 #98, R1-1908219; Prague, CZ; Aug. 26-30, 2019 (11 pages).
3GPP TS 38.214 V15.5.0; "3rd Generation Partnership Project; Technical Specification Group Radio Access Network; NR; Physical layer procedures for data (Release 15)"; Mar. 2019 (103 pages).
Office Action issued in Japanese Application No. 2021-545062, dated Oct. 31, 2023 (5 pages).
OPPO; "Physical layer procedure for NR-V2X sidelink"; 3GPP TSG RAN WG1 #97, R1-1906475, Reno, USA; May 13-17, 2019 (12 pages).
Office Action issued in Chinese Application No. 201980099933.1, dated May 31, 2024 (16 pages).
3GPP TSG-RAN WG2 #106, R2-1907416 "Discussion on HARQ feedback enable and disable"; Huawei, HiSilicon; Reno, USA; May 13-17, 2019 (5 pages).
Office Action issued in Australian Patent Application No. 2019465791, issued Apr. 8, 2025 (6 pages).
Office Action issued in European Application No. 19945167.5, mailed Feb. 20, 2025 (8 pages).
Interdigital, Inc.: "On Physical Layer Procedures for NR V2X Sidelink"; 3GPP TSG RAN WG1 #97, R1-1907096, Reno, USA, May 13-17, 2019 (9 pages).
Qualcomm Incorporated: "Physical layer procedures for sidelink"; 3GPP TSG RAN WG1 #98, R1-1909257, Prague, CZ, Aug. 26-30, 2019 (19 pages).

* cited by examiner

TERMINAL AND COMMUNICATION METHOD

TECHNICAL FIELD

The present invention relates to a terminal and a communication method in a radio communication system.

BACKGROUND ART

For Long Term Evolution (LTE) and LTE successor systems (e.g., LTE-Advanced (LTE-A) and New Radio (NR) (which is also referred to as 5G)), sidelink (which is also referred to as Device to Device (D2D)) technology has been studied in which terminals, such as User Equipment (UE), communicate directly with each other without going through a base station.

In addition, implementation of Vehicle to Everything (V2X) has been studied and technical specifications have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a rode-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

RELATED ART DOCUMENT

Non-Patent Document

Non-Patent Document 1: 3GPP TS 38.214 V15.5.0 (2019-03)

SUMMARY OF THE INVENTION

Problem to be Solved by the Invention

In a sidelink communication of Release 16 NR, Hybrid Automatic Repeat Request (HARQ) is expected to be introduced. In sidelink communication, HARQ-Acknowledgement (HARQ-ACK) is transmitted by using a Physical Sidelink Feedback Channel (PSFCH).

There is a need for clarifying an operation related to feedback performed by a transmitting terminal to a base station when a function for transmitting a HARQ-ACK from a receiving terminal to the transmitting terminal through a PSFCH is disabled.

Means for Solving the Problem

According to an aspect of the present invention, there is provided a terminal including a transmitting unit that transmits, on a sidelink resource, at least one of a transport block or control information; and a control unit that selects a specific operation related to feedback, to a base station, of Hybrid Automatic Repeat Request-Acknowledgement (HARQ-ACK) for the sidelink resource, in response to detecting that feedback for the at least one of the transport block or the control information is not performed.

Advantage of the Invention

According to an embodiment, an operation is clarified that is related to feedback performed by a transmitting terminal to a base station when a function for transmitting a HARQ-ACK from a receiving terminal to the transmitting terminal through a PSFCH is disabled.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of inter-terminal direct communication according to the embodiments is assumed to be LTE or NR sidelink (SL (sidelink)), but the method of inter-terminal direct communication is not limited to this method. Additionally, the name "sidelink" is an example and Uplink (UL) may include a function of SL without using the name "sidelink." SL may be distinguished from Downlink (DL) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used for synchronization (PSS/SSS/PSSS/SSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In the embodiments, it is mainly assumed that a terminal (which may be referred to as user equipment (UE)) is installed in a vehicle, but embodiments of the present invention are not limited to this configuration. For example, a terminal may be a terminal carried by a person, a terminal may be a device installed in a drone or an aircraft, or a terminal may be a base station, an RSU, a relay station (relay node), a user equipment having a scheduling capability, or the like.

System Configuration

Figure 1:
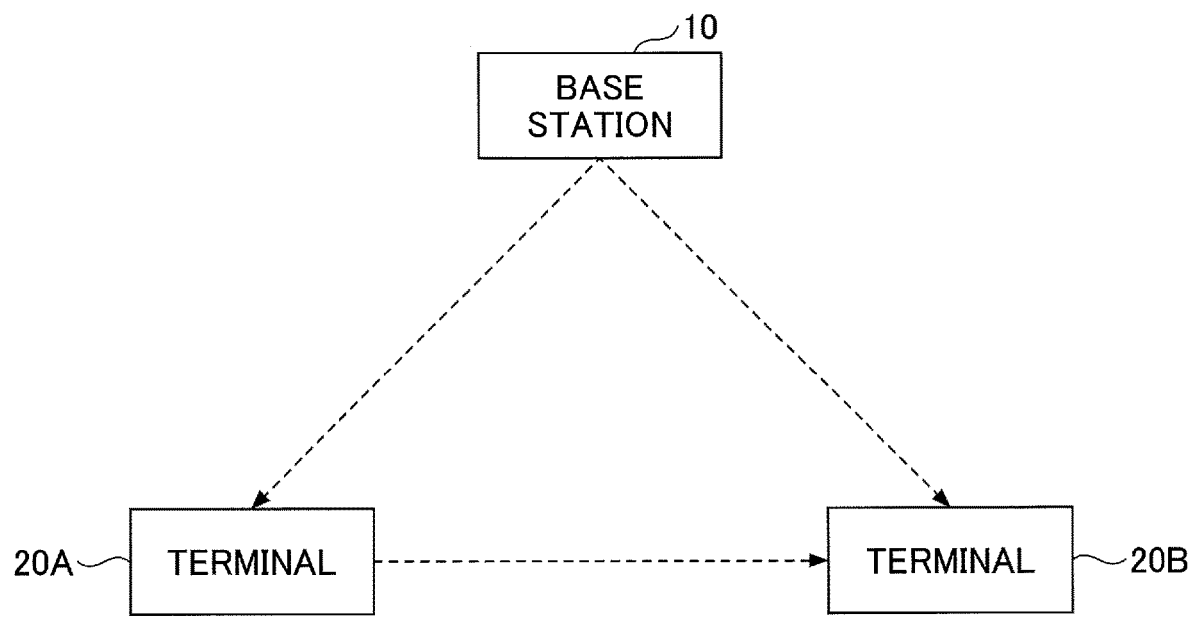
FIG. 1 is a diagram illustrating an example of a configuration of a radio communication system according to an embodiment.

FIG. 1 is a diagram illustrating an example of a configuration of a radio communication system according to an embodiment. As illustrated in FIG. 1, a radio communication system according to the embodiment includes a base station 10, a terminal 20A, and a terminal 20B. Note that, in practice, there may be a large number of terminals, but FIG. 1 illustrates the terminal 20A and the terminal 20B as an example.

In FIG. 1, the terminal 20A is intended to be the transmitting side and the terminal 20B is intended to be the receiving side. However, each of the terminal 20A and the terminal 20B is provided with both transmission function and reception function. In the following, when the terminals 20A, 20B, and the like are not particularly distinguished, it is simply described as the terminal 20 or the terminal. In FIG. 1, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In the embodiments, the terminal 20 is, for example, a device installed in a vehicle such as an automobile and has a function of cellular communication as a UE in the LTE or NR and a side link function. Additionally, the terminal 20 includes functions, such as a GPS device, a camera, various types of sensors, for obtaining report information (location, event information, or the like). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration or resource allocation). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14.

In a sidelink communication of 3GPP Release 16 NR, Hybrid Automatic Repeat Request (HARQ) is expected to be introduced. In a sidelink communication, a HARQ-Acknowledgement (HARQ-ACK) is transmitted by using a Physical Sidelink Feedback Channel (PSFCH).

A transport block is transmitted from a transmitting terminal 20A to a receiving terminal 20B on a Physical Sidelink Control Channel (PSCCH)/a Physical Sidelink Shared Channel (PSSCH). In response, the terminal 20B transmits a HARQ-ACK to the terminal 20A in the PSFCH.

Figure 2:
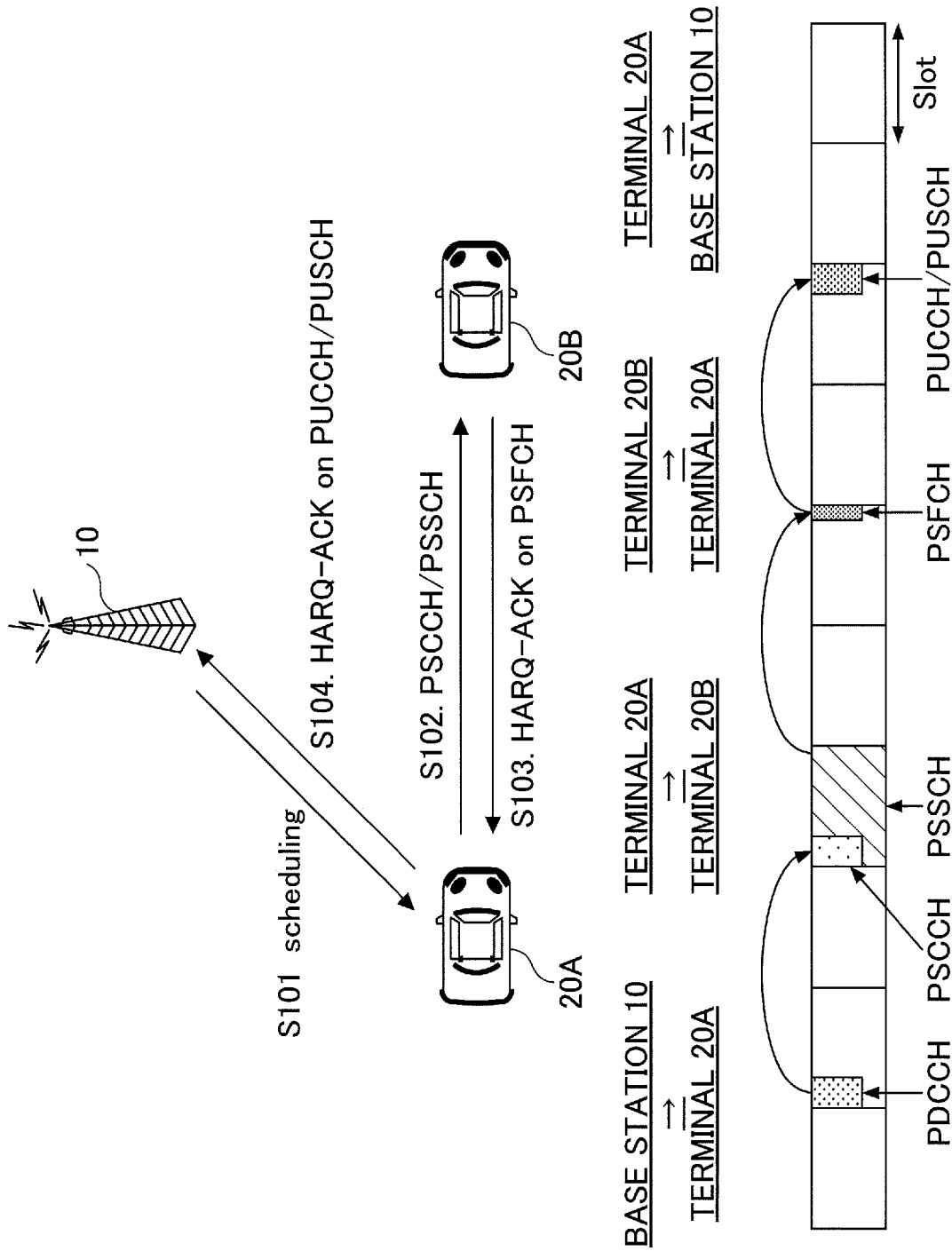
FIG. 2 is a diagram illustrating an example of SL transmission mode 1 specified in NR V2X.

In a case of an SL transmission mode 1 defined in NR V2X, as illustrated in FIG. 2, it is expected that the transmitting terminal 20A transmits a HARQ-ACK of a sidelink to the base station 10 (gNB). In the present invention, "the HARQ-ACK of the sidelink" may mean a HARQ-ACK corresponding to a sidelink channel and/or a sidelink resource. More specifically, for example, as illustrated in FIG. 2, the base station 10 performs scheduling of the terminal 20A (S101), and the terminal 20A transmits a transport block to the terminal 20B on a PSCCH/PSSCH (S102). The terminal 20B transmits, to the terminal 20A, feedback in response to the transmission of the transport block on the PSCCH/PSSCH (S103), and based on this, the terminal 20A transmits HARQ-ACK feedback to the base station 10 (S104). For example, the terminal 20A may relay, to the base station 10, a HARQ-ACK (a positive response (ACK: acknowledgement) or a negative response (NACK: negative-acknowledgement)) received from the terminal 20B.

For example, a transmission function for transmitting a HARQ-ACK via a PSFCH from the terminal 20B to the terminal 20A can be enabled or disabled by a (pre)configuration. In the present specification, "disabling" as in "disabling a function of transmitting a HARQ-ACK via a PSFCH from the receiving terminal 20B to the transmitting terminal 20A" is not limited to disabling by a (pre)configuration (condition 1) and includes at least condition 2 to condition 8 described below.

Condition 2

For example, instructing, with Sidelink Control Information (SCI), to disable the transmission function for transmitting the HARQ-ACK via the PSFCH from the receiving terminal 20B may be "disabling the transmission function for transmitting the HARQ-ACK via the PSFCH from the receiving terminal 20B."

Condition 3

Furthermore, for example, autonomously disabling the transmission function for transmitting the HARQ-ACK via the PSFCH from the receiving terminal 20B, based on a channel state (QoS parameter or the like) may be "disabling the transmission function for transmitting the HARQ-ACK via the PSFCH from the receiving terminal 20B."

Condition 4

Furthermore, for example, disabling the transmission function for transmitting the HARQ-ACK via the PSFCH from the receiving terminal 20B in a case where a distance between the transmitting terminal 20A and the receiving terminal 20B is greater than or equal to a threshold value may be "disabling the transmission function for transmitting the HARQ-ACK via the PSFCH from the receiving terminal 20B."

Condition 5

Furthermore, for example, as a feedback method for groupcast, there is a method in which the receiving terminal 20 returns only NACKs. In this method, in a case where the receiving terminal 20 successfully receives a transport block in a sidelink, the receiving terminal 20 does not transmit an ACK via the PSFCH. Not transmitting an ACK via the PSFCH from the receiving terminal 20 in a case where a sidelink communication is successfully received, as described above, may be "disabling the transmission function for transmitting the HARQ-ACK via the PSFCH from the receiving terminal 20B."

Condition 6

Furthermore, for example, not transmitting the HARQ-ACK via the PSFCH from the receiving terminal 20B in accordance with the order of priority of the sidelink communication may be "disabling the transmission function for transmitting the HARQ-ACK via the PSFCH from the receiving terminal 20B."

Condition 7

Furthermore, for example, not transmitting the HARQ-ACK via the PSFCH from the receiving terminal 20B in accordance with a cast type (for example, in a case where the cast type is broadcast) may be "disabling the transmission function for transmitting the HARQ-ACK via the PSFCH from the receiving terminal 20B."

Condition 8

Furthermore, for example, not transmitting the HARQ-ACK via the PSFCH from the receiving terminal 20B in a case where a timing of transmitting a HARQ-ACK via the PSFCH from the receiving terminal 20B overlaps a timing of another sidelink transmission from the receiving terminal 20B or in a case where the timing of transmitting a HARQ-ACK via the PSFCH from the receiving terminal 20B overlaps a timing of a sidelink reception by the receiving terminal 20B may be "disabling the transmission function for transmitting the HARQ-ACK via the PSFCH from the receiving terminal 20B."

Problem

There is a need for clarifying an operation related to a feedback performed from the transmitting terminal 20A to the base station 10 in a case where a function of transmitting a HARQ-ACK via the PSFCH from the receiving terminal 20B to the transmitting terminal 20A is disabled.

Proposal

In a case where a function of transmitting a HARQ-ACK via a PSFCH from the receiving terminal 20B to the transmitting terminal 20A is disabled, the transmitting terminal 20A may perform a specific operation related to a sidelink HARQ-ACK feedback.

Proposal A

Figure 3:
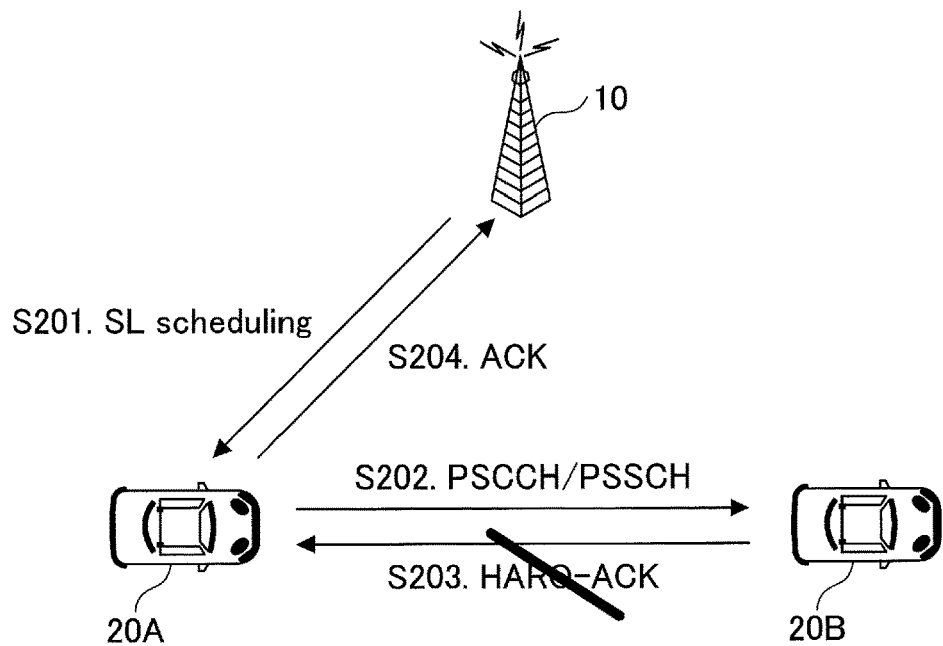
FIG. 3 is a diagram illustrating an example of Proposal A.

In a case where a function of transmitting a HARQ-ACK via a PSFCH from the receiving terminal 20B to the transmitting terminal 20A is disabled, as illustrated in FIG. 3, the transmitting terminal 20A transmits a transport block via a PSCCH/PSSCH to the terminal 20B in step S202, but does not receive a HARQ-ACK from the receiving terminal 20B in step S203. In this case, the terminal 20A may transmit an ACK to the base station 10 in step S204. In other words, the terminal 20A having transmitted the PSCCH/PSSCH on the sidelink resource scheduled by the base station 10 may transmit an ACK to the base station 10, as an HARQ-ACK corresponding to the sidelink resource, in a case where a function of transmitting a HARQ-ACK via the PSFCH from the receiving terminal 20B to the transmitting terminal 20A is disabled. For example, in a case where the transport block is transmitted via the PSCCH/PSSCH from the terminal 20A to the terminal 20B in step S202 but the terminal 20B does not transmit a feedback to the terminal 20A according to a (pre)configuration, it is assumed that it is not necessary for the terminal 20A to request a retransmission resource from the base station 10. Accordingly, it is assumed that it is not necessary for the terminal 20A to return a NACK to the base station 10. Accordingly, the terminal 20A may return an ACK to the base station 10.

A-1

In a case where the sidelink HARQ feedback is disabled, a time interval from (i) at least one of a timing of a PDCCH for scheduling a sidelink resource, a timing of PSCCH/PSSCH on a scheduled sidelink resource, or a timing of a PSFCH corresponding to the PSCCH/PSSCH until (ii) a timing of performing a HARQ feedback from the terminal 20A to the base station 10 may be shorter than the corresponding time interval in a case in which the sidelink HARQ feedback is enabled.

It should be noted that the case where the sidelink HARQ feedback is disabled includes at least the cases where the sidelink HARQ feedback is disabled under the condition 1 to the condition 8 described above.

According to the method of Proposal A, even if the sidelink HARQ feedback is disabled, it is ensured that the terminal 20A returns an ACK to the base station 10. Accordingly, for the operation for transmitting a feedback from the terminal to the base station, it is not necessary to introduce a new function, which reduces the burden in the implementation.

Proposal B

Figure 4:
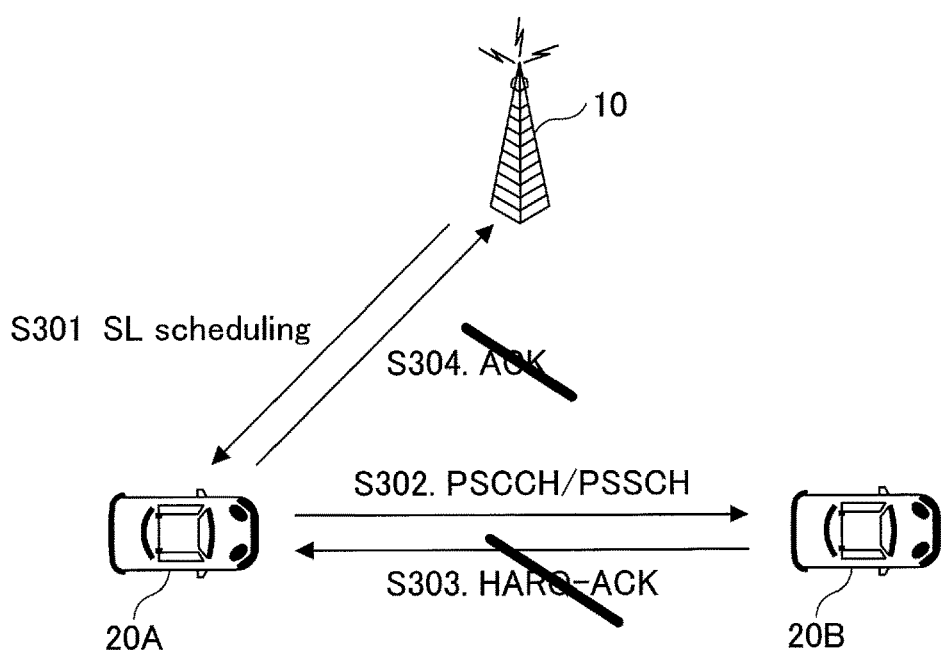
FIG. 4 is a diagram illustrating an example of Proposal B.

In a case where a function of transmitting a HARQ-ACK via a PSFCH from the receiving terminal 20B to the transmitting terminal 20A is disabled, as illustrated in FIG. 4, for example, the transmitting terminal 20A transmits a transport block via a PSCCH/PSSCH to the terminal 20B in step S302, but does not receive the HARQ-ACK from the receiving terminal 20B in step S303. In this case, the terminal 20A need not transmit a HARQ-ACK to the base station 10 in step S304. In other words, the terminal 20A having transmitted the PSCCH/PSSCH on the sidelink resource scheduled by the base station 10 need not transmit a HARQ-ACK to the base station 10 as an HARQ-ACK corresponding to the sidelink resource, in a case where a function of transmitting a HARQ-ACK via the PSFCH from the receiving terminal 20B to the transmitting terminal 20A is disabled.

B-1

For example, it is assumed that, in a case where the sidelink HARQ feedback is not disabled, it is expected that the terminal 20A transmits, to the base station 10, a HARQ-ACK corresponding to the sidelink resource while multiplexing the HARQ-ACK corresponding to the sidelink resource with another HARQ-ACK in step S304 of FIG. 4. In this case, in a case where the HARQ feedback of the sidelink is disabled, the terminal 20A may configure an "ACK" as the HARQ corresponding to the sidelink resource and transmit, to the base station 10, the "ACK" while multiplexing the "ACK" with another HARQ-ACK in step S304 of FIG. 4. In the above step S304, in a case where it is expected that the terminal 20A transmits the HARQ-ACK corresponding to the sidelink resource to the base station 10 without multiplexing the HARQ-ACK with another HARQ-ACK, the terminal 20A need not transmit the HARQ-ACK corresponding to the sidelink resource to the base station 10.

B-2

For example, it is assumed that, in a case where the sidelink HARQ feedback is not disabled, it is expected that the terminal 20A transmits, to the base station 10, the HARQ-ACK corresponding to the sidelink resource while multiplexing the HARQ-ACK corresponding to the sidelink resource with another HARQ-ACK in step S304 in FIG. 4. In this case, if the sidelink HARQ feedback is disabled, the terminal 20A need not transmit the HARQ-ACK corresponding to the sidelink resource to the base station 10 in step S304 in FIG. 4. In this case, if the sidelink HARQ feedback is not disabled, the another HARQ-ACK expected to be transmitted to the base station 10 while being multiplexed with the HARQ-ACK corresponding to the sidelink resource may be transmitted to the base station 10 at a smaller payload size than a payload size in a case where the another HARQ-ACK is transmitted while being multiplexed with the HARQ-ACK corresponding to the sidelink resource in step S304 in FIG. 4.

B-3

In B-3, in accordance with the type of the HARQ-ACK codebook, it may be determined as to whether the HARQ-ACK corresponding to the sidelink resource is to be transmitted to the base station 10. Here, the HARQ-ACK codebook defines how to bundle multiple HARQ-ACKs when the multiple HARQ-ACKs are multiplexed and transmitted. For example, it is assumed that, in a case where the sidelink HARQ feedback is not disabled, it is expected that the terminal 20A transmits, to the base station 10, a HARQ-ACK while multiplexing the HARQ-ACK with another HARQ-ACK in step S304 in FIG. 4. In this case, if the sidelink HARQ feedback is disabled, and the type of the HARQ-ACK codebook is (semi-)static (for example, the size of the HARQ-ACK codebook is known to the terminal 20 and the base station 10), the terminal 20A may configure an "ACK" as the HARQ-ACK corresponding to the sidelink resource and transmit, to the base station 10, the "ACK" while multiplexing the "ACK" with another HARQ-ACK in step S304 of FIG. 4. Furthermore, in a case where the sidelink HARQ feedback is disabled, and the type of the HARQ-ACK codebook is dynamic, the terminal 20A need not transmit the HARQ-ACK corresponding to the sidelink resource to the base station 10 in step S304 in FIG. 4.

B-4

For example, it is assumed that, in a case where the sidelink HARQ feedback is not disabled, it is expected that the terminal 20A transmits, to the base station 10, a HARQ-ACK corresponding to the sidelink resource while multiplexing the HARQ-ACK corresponding to the sidelink resource with another HARQ-ACK in step S304 of FIG. 4. In this case, it is assumed that, if the sidelink HARQ feedback is disabled, the terminal 20A does not transmit the HARQ-ACK corresponding to the sidelink resource to the base station 10 in step S304 in FIG. 4. In this case, a Downlink Assignment Index (DAI) in scheduling Downlink Control Information (DCI) may be calculated as a value ignoring the HARQ-ACK corresponding to the sidelink resource that is not to be transmitted.

It should be noted that the case where the sidelink HARQ feedback is disabled includes at least the cases where the sidelink HARQ feedback is disabled under the condition 1 to the condition 8 as described above.

According to the method of Proposal B, while maintaining the assumption of the payload size of the HARQ-ACK between the base station 10 and the terminal 20A, a meaningless transmission of the HARQ-ACK from the terminal 20A to the base station 10 can be reduced.

Proposal C

If, according to a (pre)configuration, a function of transmitting a HARQ-ACK via a PSFCH from the receiving terminal 20B to the transmitting terminal 20A is disabled, a transmission of a HARQ-ACK from the terminal 20A to the base station 10 may be disabled by a (pre)configuration or scheduling DCI.

C-1

For example, by one parameter for a (pre)configuration, a HARQ feedback from the terminal 20B to the terminal 20A via a PSFCH and a HARQ feedback from the terminal 20A to the base station 10 may be enabled or disabled.

C-2

For example, a parameter for a (pre) configuration for enabling or disabling a HARQ feedback via the PSFCH from the terminal 20B to the terminal 20A may be different from a parameter for a (pre)configuration for enabling or disabling a HARQ feedback from the terminal 20A to the base station 10. In this case, for example, a configuration may be such that, if the HARQ feedback via the PSFCH from the terminal 20B to the terminal 20A is disabled, it is ensured that the HARQ-ACK feedback from the terminal 20A to the base station 10 is disabled.

C-3

For example, in a case where a HARQ feedback via a PSFCH from the terminal 20B to the terminal 20A is disabled by using a scheduling DCI, a notification of disabling the sidelink HARQ feedback may be transmitted to the terminal 20, for example, by using a single dedicated field, or alternatively, may be transmitted by using a PUCCH resource indicator field and/or a feedback slot indication field. For example, the fact that all the values of the feedback slot indication field are zero may indicate that the sidelink HARQ feedback is disabled.

It should be noted that the case where the sidelink HARQ feedback is disabled includes at least the cases where the sidelink HARQ feedback is disabled under the condition 1 to the condition 8 described above.

According to the method of Proposal C, a meaningless transmission of a HARQ feedback from the terminal 20A to the base station 10 can be prevented.

Proposal D

A content of a HARQ-ACK transmitted from the transmitting terminal 20A to the base station 10 (or whether a HARQ-ACK is transmitted from the transmitting terminal 20A to the base station 10) may depend on a condition for disabling the sidelink HARQ feedback.

For example, in a case where the sidelink HARQ feedback is disabled based on at least one of a (pre)configuration, an instruction of disabling by using SCI, a case of a groupcast (a case where only a NACK is to be fed back), or a cast type (broadcast) (i.e., a case where the transmitting terminal 20A knows the reason why the receiving terminal 20B does not transmit a sidelink HARQ-ACK), the terminal 20A may transmit an "ACK" as the sidelink HARQ-ACK to the base station 10. Alternatively, the terminal 20A need not transmit the sidelink HARQ-ACK to the base station 10.

Figure 5:
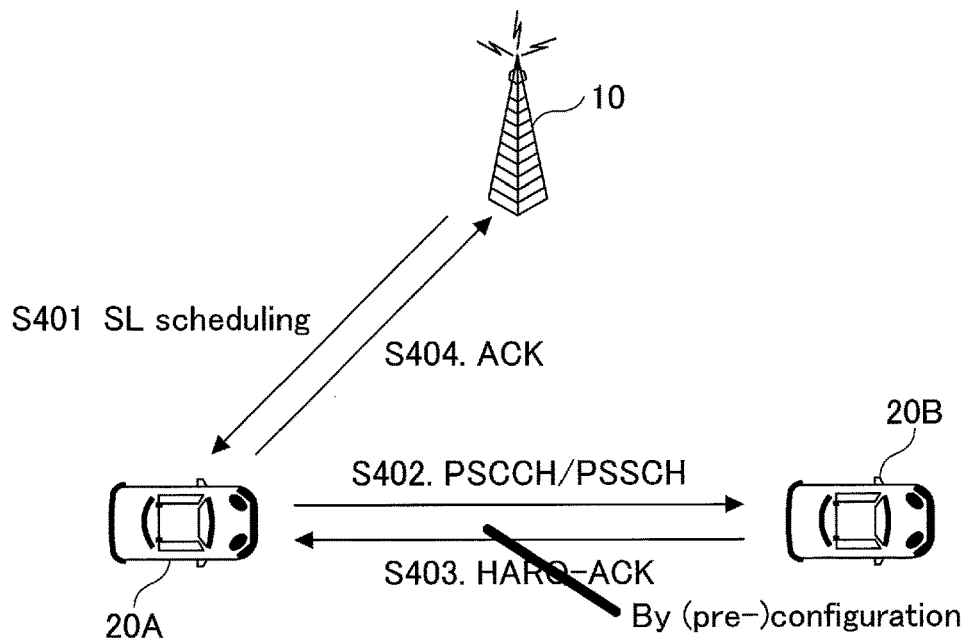
FIG. 5 is a diagram illustrating an example of a case in which sidelink HARQ feedback is disabled based on a (pre)configuration.

FIG. 5 is a diagram illustrating an example of a case where the sidelink HARQ feedback is disabled based on a (pre)configuration. The terminal 20A knows the reason why the terminal 20B does not transmit the HARQ-ACK in step S403. Accordingly, the terminal 20A transmits an ACK as the sidelink HARQ-ACK to the base station 10 in step S404.

For example, in a case where the sidelink HARQ feedback is disabled based on at least one of a channel state (QoS parameter and the like), a distance between the transmitting terminal 20A and the receiving terminal 20B, the order of priority, an overlapping of a timing of a transmission with a timing of another transmission, or an overlapping of a timing of a transmission with a timing of a reception (i.e., a case where the transmitting terminal 20A does not know the reason why the receiving terminal 20B does not transmit a sidelink HARQ-ACK), the terminal 20A may request scheduling again by transmitting a "NACK" as the sidelink HARQ-ACK to the base station 10.

Figure 6:
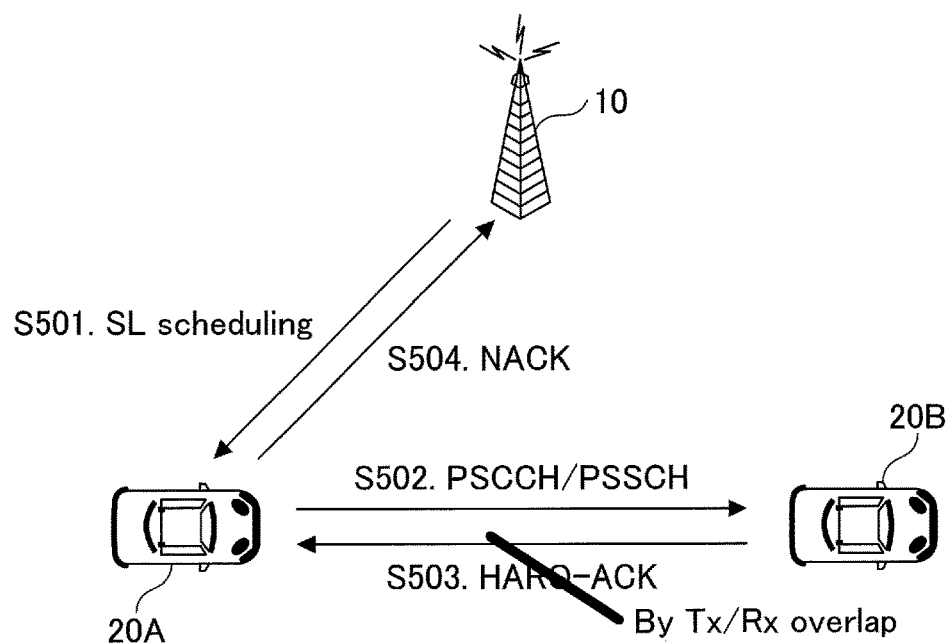
FIG. 6 is a diagram illustrating an example of a case in which sidelink HARQ feedback is disabled based on an overlap between a transmission timing and a reception timing.

FIG. 6 is a diagram illustrating an example of a case where the sidelink HARQ feedback is disabled based on overlapping between the timing of transmission and the timing of reception. The terminal 20A does not know the reason why the terminal 20B does not transmit the sidelink HARQ-ACK in step S503. Accordingly, the terminal 20A requests the base station 10 to perform scheduling again by transmitting a "NACK" as the sidelink HARQ-ACK to the base station 10 in step S504.

According to the method of Proposal D, only in a case where it is necessary for the terminal 20A to retransmit a transport block to the terminal 20B via a PSCCH/PSSCH, the terminal 20A can request the base station 10 for a resource for the retransmission.

Device Configuration

Next, a functional configuration example of the base station 10 and the terminal 20 that perform the processing operations described above is described.

Base Station 10

Figure 7:
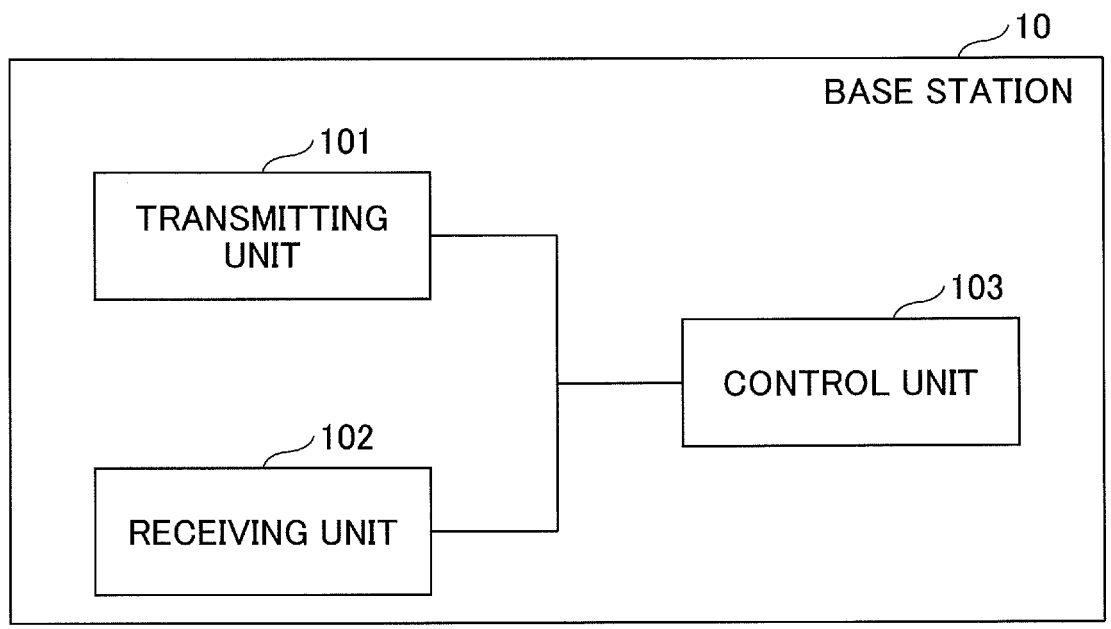
FIG. 7 is a diagram illustrating an example of a functional configuration of a base station according to an embodiment.

FIG. 7 is a diagram illustrating an example of a functional configuration of the base station 10. As illustrated in FIG. 7, the base station 10 includes a transmitting unit 101, a receiving unit 102, and a control unit 103. The functional configuration illustrated in FIG. 7 is merely one example. The functional division and names of functional units may be any division and names, provided that the operation according to the embodiments of the present invention can be performed. Note that the transmitting unit 101 may be referred to as a transmitting device, and the receiving unit 102 may be referred to as a receiving device.

The transmitting unit 101 includes a function for generating a signal to be transmitted to the terminal 20 and wirelessly transmitting the signal. The receiving unit 102 includes a function for receiving various types of signals wirelessly transmitted from the terminal 20 and obtaining a higher layer signal from the received signal. Furthermore, the receiving unit 102 includes a function for measuring a received signal to obtain a quality value.

The control unit 103 controls the base station 10. Note that a function of the control unit 103 related to transmission may be included in the transmitting unit 101 and a function of the control unit 103 related to reception may be included in the receiving unit 102.

For example, the control unit 103 of the base station 10 configures a resource for a sidelink communication for the terminal 20, generates a message for specifying a resource for a configured sidelink communication, and the transmitting unit 101 transmits the message to the terminal 20.

For example, the receiving unit 102 of the base station 10 receives a HARQ-ACK transmitted from the terminal 20. In a case where the HARQ-ACK received by the receiving unit 102 is a NACK, the control unit 103 may configure a resource for retransmission in a sidelink by the terminal 20 and generate a message for specifying the configured resource for retransmission in the sidelink, and the transmitting unit 101 may transmit the message to the terminal 20.

Terminal 20

Figure 8:
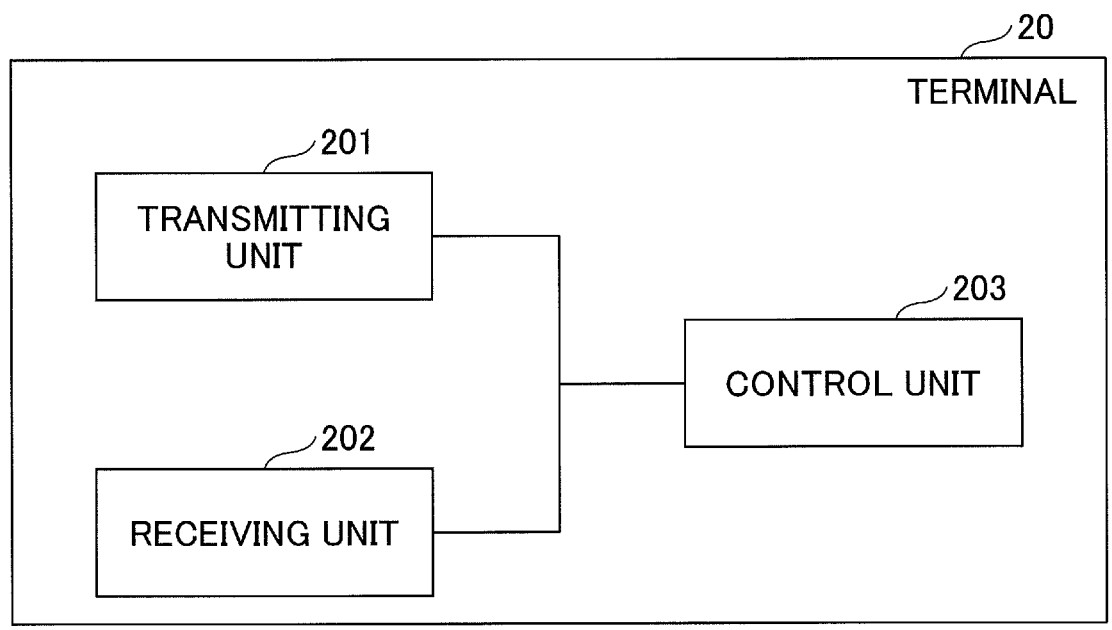
FIG. 8 is a diagram illustrating an example of a functional configuration of a terminal according to an embodiment.

FIG. 8 is a diagram illustrating an example of a functional configuration of the terminal 20. As illustrated in FIG. 8, the terminal 20 includes a transmitting unit 201, a receiving unit 202, and a control unit 203. The functional configuration illustrated in FIG. 8 is merely an example. The functional division and names of functional units may be any division and names, provided that the operation according to the embodiments can be performed. Note that the transmitting unit 201 may be referred to as a transmitting device, and the receiving unit 202 may be referred to as a receiving device. Furthermore, the terminal 20 may be the transmitting terminal 20A or the receiving terminal 20B. Furthermore, the terminal 20 may be the scheduling terminal 20.

The transmitting unit 201 generates a transmitting signal from transmitting data and transmits the transmitting signal through radio. The receiving unit 202 receives various types of signals and obtains a higher layer signal from the received physical layer signal. The receiving unit 202 includes a function for measuring a received signal and obtaining a quality value.

The control unit 203 controls of the terminal 20. Note that the function of the control unit 203 related to transmission may be included in the transmitting unit 201, and the function of the control unit 203 related to reception may be included in the receiving unit 202.

For example, the receiving unit 202 of the terminal 20 receives a signal including a higher layer parameter including a configuration information of a resource for a sidelink transmission transmitted from the base station 10, the control unit 203 of the terminal 20 configures a resource according to the configuration information included in the received higher layer parameter, and the transmitting unit 201 of the terminal 20 performs a sidelink data transmission by using the configured resource.

For example, the receiving unit 202 of the terminal 20 receives the sidelink HARQ-ACK transmitted from the receiving terminal 20. The transmitting unit 201 transmits a HARQ-ACK to the base station 10 in response to the receiving unit 202 receiving the sidelink HARQ-ACK.

For example, in a case where the transmitting unit 201 performs a sidelink transmission and thereafter the receiving unit 202 does not receive a HARQ-ACK from the receiving terminal 20, for example, the control unit 203 of the terminal 20 may select to perform a specific operation related to a sidelink HARQ-ACK feedback described in Proposal A to Proposal D described above.

Hardware Configuration

The block diagrams (FIG. 7 to FIG. 8) used for the description of the above embodiments illustrate blocks of functional units. These functional blocks (components) are implemented by any combination of at least one of hardware or software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 9:
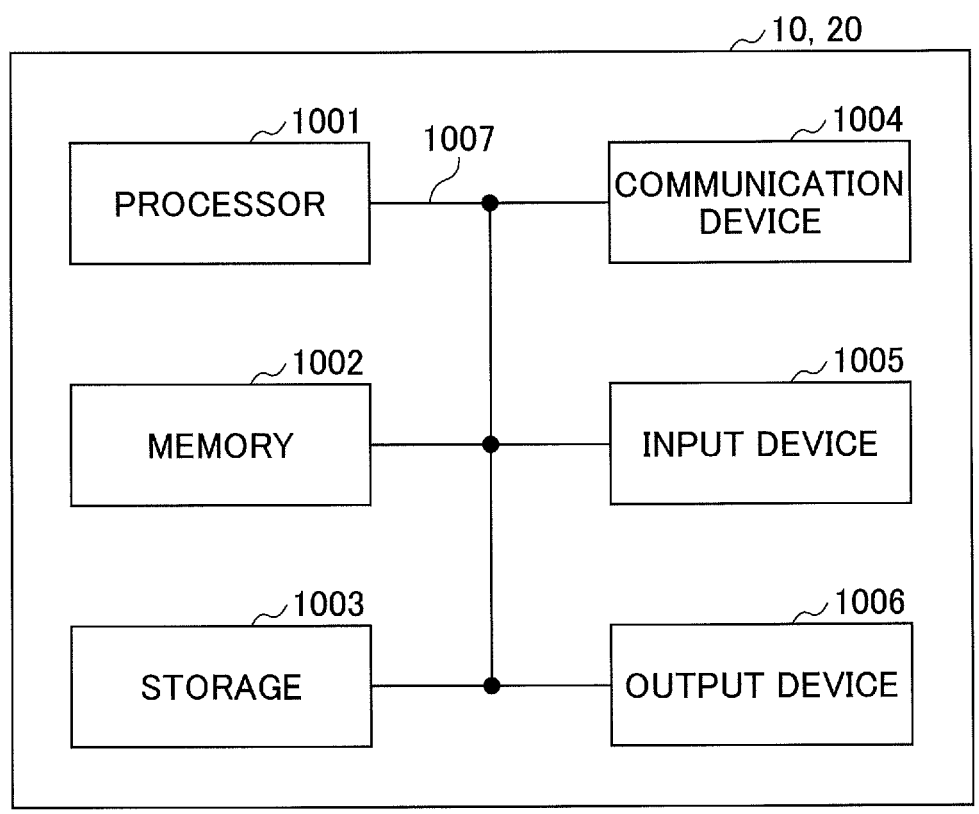
FIG. 9 is a diagram illustrating an example of a hardware configuration of the base station and the terminal according to an embodiment.

For example, the terminal 20 and the base station 10 according to the embodiments of the present invention may function as computers performing the process of the radio communication according to the embodiments of the present invention. FIG. 9 is a diagram illustrating an example of a hardware configuration of the terminal 20 and the base station 10 according to the embodiment. Each of the above-described terminal 20 and the base station 10 may be physically configured as a computer device including a processor 1001, a memory 1002, a storage device 1003, a communication device 1004, an input device 1005, an output device 1006, a bus 1007, or the like.

Note that, in the following description, the term "device" can be replaced with a circuit, a device, a unit, or the like. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage device 1003.

The processor 1001, for example, operates an operating system to control the entire computer. The processor 1001 may be configured with a central processing unit (CPU: Central Processing Unit) including an interface with a peripheral device, a control device, a processing device, a register, or the like.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the control unit 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), and a Random Access Memory (RAM). The memory 1002 may be referred to as a register, a cache, a main memory (main storage device), or the like. The memory 1002 may store a program (program code), a software module, or the like, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, or a magnetic strip. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The terminal 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

Conclusion of the Embodiments

In this specification, at least the following terminal and communication method are disclosed.

A terminal including a transmitting unit that transmits, on a sidelink resource, at least one of a transport block or control information; and a control unit that selects a specific operation related to feedback, to a base station, of Hybrid Automatic Repeat Request-Acknowledgement (HARQ-ACK) for the sidelink resource, in response to detecting that feedback for the at least one of the transport block or the control information is not performed.

According to the above configuration, details of an operation are clarified related to feedback performed from a transmitting terminal to a base station in a case where a function of transmitting a HARQ-ACK via the PSFCH from a receiving terminal to the transmitting terminal is disabled.

The control unit may select to transmit a positive acknowledgement (ACK) to the base station, as the specific operation related to the feedback, to the base station, of the HARQ-ACK.

According to the above configuration, even if the sidelink HARQ feedback is disabled, it is ensured that the terminal returns an ACK to the base station. Accordingly, for the operation for transmitting a feedback from the terminal to the base station, it is not necessary to introduce a new function, which reduces the burden in the implementation.

The control unit may select not to perform a feedback of a HARQ-ACK to the base station, as the specific operation related to the feedback, to the base station, of the HARQ-ACK.

According to the above configuration, a meaningless transmission of a HARQ-ACK from the terminal to the base station can be reduced.

When the feedback is not performed based on a configuration, the control unit may select, based on the configuration, not to perform the feedback of the HARQ-ACK for the sidelink resource to the base station, as the specific operation related to the feedback, to the base station, of the HARQ-ACK.

According to the above configuration, a meaningless transmission of a HARQ feedback from the terminal to the base station can be prevented.

When the feedback is not performed, the control unit may determine the specific operation related to the feedback, to the base station, of the HARQ-ACK, in accordance with a condition under which the feedback is not performed.

According to the above configuration, only in a case where it is necessary for the transmitting terminal to retransmit a transport block to a receiving terminal via a PSCCH/PSSCH, the transmitting terminal can request the base station for a resource for the retransmission.

A communication method to be executed by a terminal, the method including transmitting, on a sidelink resource, at least one of a transport block or control information; and selecting a specific operation related to feedback, to a base station, of Hybrid Automatic Repeat Request-Acknowledgement (HARQ-ACK) for the sidelink resource, in response to detecting that feedback for the at least one of the transport block or the control information is not performed.

According to the above configuration, details of an operation are clarified related to feedback performed from a transmitting terminal to a base station in a case where a function of transmitting a HARQ-ACK via the PSFCH from a receiving terminal to the transmitting terminal is disabled.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (as long as there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no contradiction. For the convenience of the description of the process, the terminal 20 and the base station 10 are described using functional block diagrams, but such devices may be implemented in hardware, software, or a combination thereof. Software operated by a processor included in the terminal 20 in accordance with the embodiments of the present invention and software operated by a processor included in the base station 10 in accordance with the embodiments of the present invention may be stored in a random access memory (RAM), a flash memory, a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base station and the user terminal is replaced with communication between multiple user terminals (e.g., may be referred to as Device-to-Device (D2D) or Vehicle-to-Everything (V2X)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standard applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (Orthogonal Frequency Division Multiplexing (OFDM) symbols, Single Carrier Frequency Division Multiple Access (SC-FDMA) symbols). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth, or transmission power that can be used in each user terminal) in units of TTIs to each user terminal. Note that the definition of the TTI is not limited to this.

The TTI may be a transmission time unit, such as a channel coded data packet (transport block), a code block, and a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, or the like are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, or the like, within the TTI.

In the present disclosure, for example, if an article is added by translation, such as "a," "an," and "the" in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in this specification. The present invention may be implemented as modifications and variations without departing from the gist and scope of the present invention as defined by the claims. Accordingly, the description of this specification is for illustrative purposes only and is not intended to have any restrictive meaning with respect to the present invention.

LIST OF REFERENCE SYMBOLS 10 base station
20 terminal
101 transmitting unit
102 receiving unit
103 control unit
201 transmitting unit
202 receiving unit
203 control unit
1001 processor
1002 memory
1003 storage
1004 communication device
1005 input device
1006 output device

The invention claimed is:

1. A terminal comprising:
a transmitter that transmits control information to indicate another terminal to enable or disable a function to transmit feedback information for a sidelink shared channel; and
a processor that configures a transmission of a feedback to a base station,
wherein to disable the function to transmit feedback information for the sidelink shared channel is to disable a function to transmit a positive acknowledgement for the sidelink shared channel using a physical sidelink feedback channel (PSFCH) and to disable a function to transmit a negative acknowledgement for the sidelink shared channel using the PSFCH,
wherein, in response to the transmitter transmitting the control information to disable the function to the another terminal and the processor determining that a retransmission of a transport block is not required, the transmitter transmits a positive acknowledgement to the base station, and
wherein, in response to the transmitter transmitting the control information to disable the function to the another terminal and the processor determining that scheduling of a retransmission of a transport block is required, the transmitter transmits a negative acknowledgement to the base station.

2. The terminal according to claim 1, wherein the processor configures, upon the transmitter transmitting the control information to disable the function to the another terminal, and upon detecting that a retransmission of the shared channel is not required, a transmission of the positive acknowledgement to the base station.

3. A communication system comprising:
a terminal; and
a base station,
wherein the terminal includes
a transmitter that transmits control information to indicate another terminal to enable or disable a function to transmit feedback information for a sidelink shared channel, and
a processor that configures a transmission of a feedback to the base station,
wherein to disable the function to transmit feedback information for the sidelink shared channel is to disable a function to transmit a positive acknowledgement for the sidelink shared channel using a physical sidelink feedback channel (PSFCH) and to disable a function to transmit a negative acknowledgement for the sidelink shared channel using the PSFCH,
wherein, in response to the transmitter transmitting the control information to disable the function to the another terminal and the processor determining that a retransmission of a transport block is not required, the transmitter transmits a positive acknowledgement to the base station, wherein, in response to the transmitter transmitting the control information to disable the function to the another terminal and the processor determining that scheduling of a retransmission of a transport block is required, the transmitter transmits a negative acknowledgement to the base station, and wherein the base station includes a receiver that receives the feedback.

4. A communication method executed by a terminal, the method comprising:

transmitting control information to indicate another terminal to enable or disable a function to transmit feedback information for a sidelink shared channel; and configuring a transmission of a feedback to a base station, wherein to disable the function to transmit feedback information for the sidelink shared channel is to disable a function to transmit a positive acknowledgement for the sidelink shared channel using a physical sidelink feedback channel (PSFCH) and to disable a function to transmit a negative acknowledgement for the sidelink shared channel using the PSFCH, wherein, in response to the terminal transmitting the control information to disable the function to the another terminal and the terminal determining that a retransmission of a transport block is not required, the terminal transmits a positive acknowledgement to the base station, and wherein, in response to the terminal transmitting the control information to disable the function to the another terminal and the terminal determining that scheduling of a retransmission of a transport block is required, the terminal transmits a negative acknowledgement to the base station.

* * * * *